US009084310B2

(12) United States Patent
Bedell et al.

(10) Patent No.: US 9,084,310 B2
(45) Date of Patent: Jul. 14, 2015

(54) METHOD AND APPARATUS FOR ADJUSTING AN AMBIENT LIGHT THRESHOLD

(75) Inventors: Ryan S. Bedell, Breinigsville, PA (US); James P. Steiner, Royersford, PA (US)

(73) Assignee: LUTRON ELECTRONICS CO., INC., Coopersburg, PA (US)

(*) Notice: Subject to any disclaimer, the term of this patent is extended or adjusted under 35 U.S.C. 154(b) by 526 days.

(21) Appl. No.: 13/492,026

(22) Filed: Jun. 8, 2012

(65) Prior Publication Data

US 2012/0313535 A1 Dec. 13, 2012

Related U.S. Application Data

(60) Provisional application No. 61/495,457, filed on Jun. 10, 2011.

(51) Int. Cl.
*H05B 37/02* (2006.01)

(52) U.S. Cl.
CPC ........ *H05B 37/0227* (2013.01); *H05B 37/0281* (2013.01); *Y02B 20/40* (2013.01); *Y02B 20/42* (2013.01); *Y02B 20/44* (2013.01); *Y02B 20/46* (2013.01)

(58) Field of Classification Search
CPC ........... H05B 37/0227; H05B 37/0281; Y02B 20/42; Y02B 20/44; Y02B 20/46; Y02B 20/40
See application file for complete search history.

(56) References Cited

U.S. PATENT DOCUMENTS

| 5,598,066 | A  | * | 1/1997  | Wiesemann et al. ......... 315/159 |
|-----------|----|---|---------|-----------------------------------|
| 7,122,976 | B1 |   | 10/2006 | Null et al.                       |
| 7,884,727 | B2 |   | 2/2011  | Tran                              |
| 7,940,167 | B2 |   | 5/2011  | Steiner et al.                    |
| 8,009,042 | B2 |   | 8/2011  | Steiner et al.                    |
| 8,199,010 | B2 |   | 6/2012  | Sloan et al.                      |
| 8,228,184 | B2 |   | 7/2012  | Blakeley et al.                   |
| 8,410,706 | B2 |   | 4/2013  | Steiner et al.                    |
| 8,451,116 | B2 |   | 5/2013  | Steiner et al.                    |
| 8,723,447 | B2 |   | 5/2014  | Steiner                           |
| 8,760,293 | B2 |   | 6/2014  | Steiner                           |
| 2008/0067955 | A1 | * | 3/2008 | Cunningham et al. ........ 315/307 |
| 2010/0052576 | A1 | * | 3/2010 | Steiner et al. ................. 315/361 |
| 2010/0207759 | A1 | * | 8/2010 | Sloan et al. .................... 340/540 |

FOREIGN PATENT DOCUMENTS

WO   WO 2010/116283 A2   10/2010

* cited by examiner

*Primary Examiner* — Jung Kim
(74) *Attorney, Agent, or Firm* — Condo Roccia Koptiw LLP

(57) ABSTRACT

A load control device adapted to be coupled between an AC power source and an electrical load for controlling the power delivered to the load includes a controller, an actuator for turning the electrical load on and off, an occupancy detection circuit, and an ambient light detector. The load control device automatically turns on the electrical load in response to the presence of an occupant only if the detected ambient light is below a predetermined ambient light level threshold. After first detecting the presence of an occupant, the load control device monitors actuations of the actuator to determine whether a user has changed the state of the load. The load control device automatically adjusts the predetermined ambient light level threshold in response to the user actuations that change the state of the load.

24 Claims, 4 Drawing Sheets

Fig. 3

METHOD AND APPARATUS FOR ADJUSTING AN AMBIENT LIGHT THRESHOLD

CROSS REFERENCES TO RELATED APPLICATIONS

This application is a non-provisional application of commonly-assigned U.S. Provisional Application No. 61/495,457, filed Jun. 10, 2011, entitled METHOD AND APPARATUS FOR ADJUSTING AN AMBIENT LIGHT THRESHOLD, the entire disclosure of which is hereby incorporated by reference.

BACKGROUND OF THE INVENTION

1. Field of the Invention

The present invention relates to load control devices for control of the power delivered from an alternating-current (AC) power source to an electrical load, and more particularly, to an ambient light threshold adjustment procedure for a load control device that is operable to control the electrical load in response to detected occupancy and ambient light conditions.

2. Description of the Related Art

Typical load control devices are operable to control the amount of power delivered to an electrical load, such as a lighting load or a motor load, from an alternating-current (AC) power source. Wall-mounted load control devices are adapted to be mounted to standard electrical wallboxes. A dimmer switch comprises a controllably conductive device (e.g., a bidirectional semiconductor switch, such as, a triac), which is coupled in series between the power source and the load. The controllably conductive device is controlled to be conductive and non-conductive for portions of a half-cycle of the AC power source to thus control the amount of power delivered to the load (e.g., using a phase-control dimming technique). A "smart" dimmer switch (i.e., a digital dimmer switch) comprises a microprocessor (or similar controller) for controlling the semiconductor switch and a power supply for powering the microprocessor.

An electronic switch (i.e., a digital switch) comprises a controllably conductive device (such as a relay or a bidirectional semiconductor switch), a microprocessor, and a power supply. In contrast to a smart dimmer switch, the controllably conductive device of an electronic switch is not controlled using the phase-controlled dimming technique, but is controlled to be either conductive or non-conductive during each half-cycle of the AC power source to thus toggle the electrical load on and off. Digital dimmers and switches may further comprise occupancy detection circuits such that the dimmers and switches are able to operate as occupancy sensors to automatically turn on lighting loads in response to the presence of an occupant (i.e., an occupancy condition) and automatically turn off the lighting loads in response to detecting the absence of an occupant (i.e., a vacancy condition).

Such a digital device may further comprise an ambient light detector such that the device will only turn on the lighting load in response to an occupancy condition when the detected (or measured) ambient light is below a predetermined ambient light level threshold. This provides energy savings as the lighting load is not turned on unnecessarily (i.e., the lighting load is not turned on in an already brightly illuminated space each time an occupant is detected). However, the value of the predetermined ambient light level threshold may not be suitable in some applications and may require adjustment once the device is installed. Some prior art digital devices do not provide for the predetermined ambient light level threshold to be adjusted once the device is installed. Other prior art digital devices may comprise a dedicated mechanism such as a knob or button for adjusting the value of the ambient light level threshold. However, such a dedicated mechanism adds additional cost to the device. Further, such a mechanism may not be visible to a user once the device is installed in a standard wallbox, thus the user may not realize that such a mechanism exists or that the ambient light level threshold can even be adjusted.

Therefore, there exists a need for an improved method of adjusting the ambient light level threshold of a digital load control device.

SUMMARY OF THE INVENTION

According to an embodiment of the present invention, a method for controlling the power delivered from an AC power source to an electrical load is provided. The method includes detecting an occupancy condition and comparing a measured ambient light level to an initial ambient light level threshold. The method further includes receiving an actuation to change the state of the electrical load within a predetermined time period after detecting the occupancy condition, and accordingly generating an adjusted ambient light level threshold in response to the step of receiving an actuation.

According to a second embodiment of the present invention, a load control device is adapted to be coupled between an AC power source and an electrical load such that the load control device can control the power delivered to the load. The load control device includes a controllably conductive device adapted to be coupled between the source and the load for controlling the power delivered to the load, and a controller operatively coupled to the controllably conductive device to render the controllably conductive device conductive and non-conductive. The load control device includes an actuator operatively coupled to the controller such that the controller is operable to render the controllably conductive device conductive and non-conductive in response to actuations of the actuator. The load control device further includes an occupancy detection circuit for detecting the presence or absence of an occupant, and an ambient light detector for measuring the ambient light level, both of which being operatively coupled to the controller. The controller is operable to render the controllably conductive device conductive and non-conductive in response to the occupancy detection circuit and the ambient light detector. The controller is further operable to automatically adjust an ambient light level threshold in response to detecting an actuation of the actuator that occurs within a predetermined time period of detecting the presence of an occupant.

According to a third embodiment of the present invention, a load control system controls the power delivered to a load, and includes at least one actuator operable to receive actuations to turn the load on or off in response to the actuations. The load control system includes an occupancy detector for detecting the presence or absence of an occupant and an ambient light detector for measuring the ambient light level. The load control system includes a controller that is operable to respond to actuations of the actuator, the detected presence or absence of the occupant, and the measured ambient light level. The load control system also includes a load control device adapted to be coupled between an AC power source and the load for controlling the power delivered to the load in response to the controller. The controller is operable to automatically adjust an ambient light level threshold in response to detecting an actuation of the actuator that occurs after detecting the presence of an occupant.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
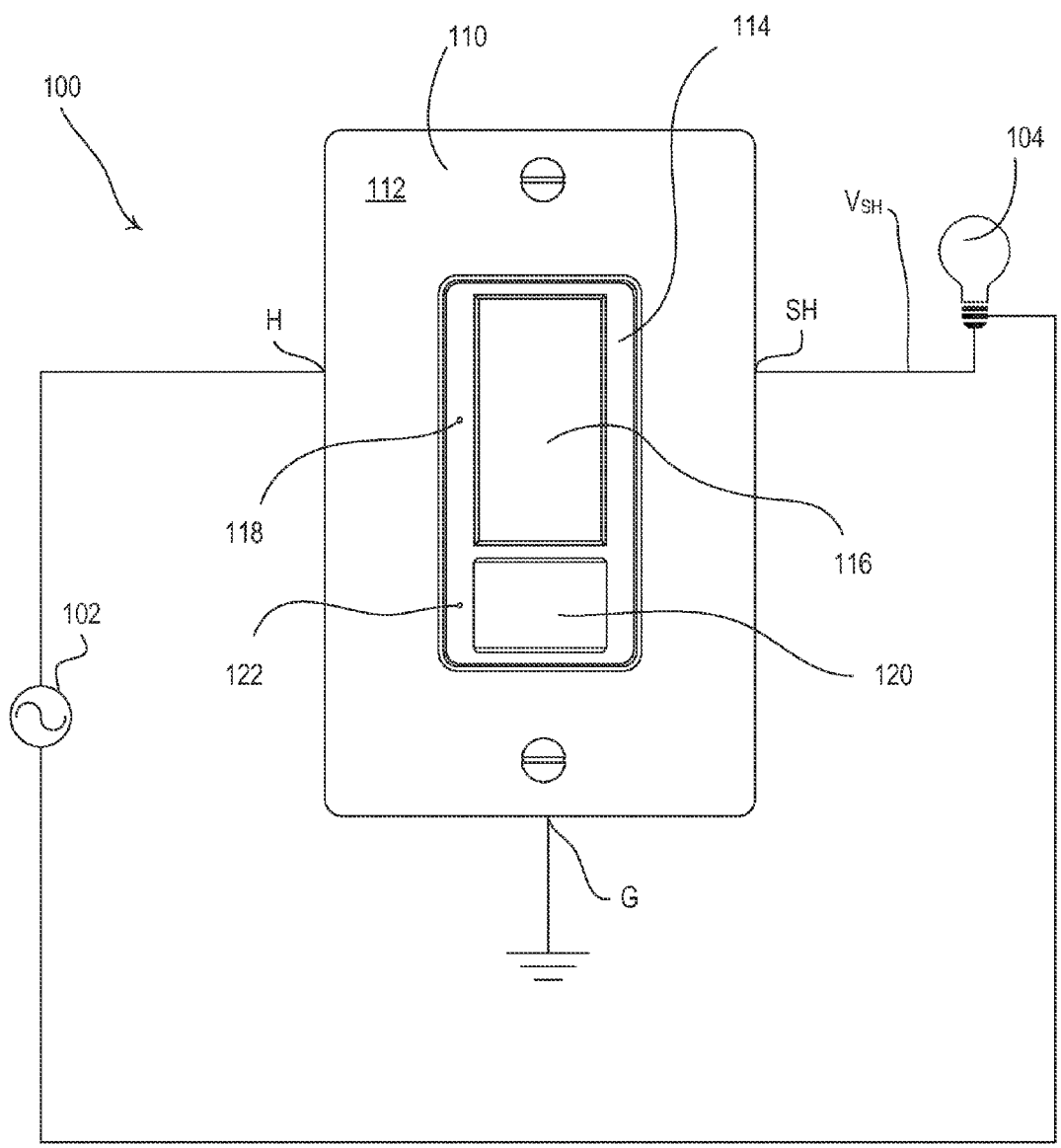
FIG. 1 is a simplified diagram of a lighting control system including an electronic switch.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a lighting control system 100 including an electronic switch 110 according to a first embodiment of the present invention. The electronic switch 110 comprises a hot terminal H and a switched hot terminal SH and is adapted to be coupled in series electrical connection between an alternating current (AC) power source 102 (e.g., 120 $V_{AC}$ @ 60 Hz or 240 $V_{AC}$ @ 50 Hz) and a lighting load 104 for controlling the power delivered to the lighting load. The electronic switch 110 generates a switched hot voltage $V_{SH}$ at the switched hot terminal SH, which is coupled to the lighting load 104 for turning the load on and off. The electronic switch 110 further comprises a ground terminal G that is adapted to be coupled to earth ground.

As shown in FIG. 1, the electronic switch 110 is adapted to be wall-mounted in a standard electrical wallbox. The electronic switch 110 comprises a faceplate 112 and a bezel 114 received in an opening of the faceplate. The electronic switch 110 further comprises a control actuator 116 (i.e., a control button) that may be actuated by a user for toggling (i.e., turning off and on) the lighting load 104, and a load visual indicator 118 for providing feedback of whether the lighting load is on or off. Alternatively, the electronic switch 110 could be implemented as a controllable screw-in module adapted to be screwed into an electrical socket (e.g., an Edison socket) of a lamp, or as a plug-in load control device adapted to be plugged into a standard electrical receptacle for receipt of power and further adapted to have a plug-in electrical load electrically connected thereto.

The electronic switch 110 also operates as an occupancy sensor to turn on the lighting load 104 in response to the presence of an occupant in the vicinity of the electronic switch (i.e., an occupancy condition), and to turn off the lighting load in response to the absence of the occupant (i.e., a vacancy condition). The electronic switch 110 comprises a lens 120 for directing the infrared energy from the occupant to an occupancy detection circuit 230 (FIG. 2), such that the electronic switch is operable to detect the occupancy and vacancy conditions. The electronic switch 110 further comprises an occupancy visual indicator 122 that is illuminated when the electronic switch has detected an occupancy condition in the space. Alternatively, the occupancy visual indicator 122 could be located behind the lens 120 such that the lens is operable to illuminate when the electronic switch 110 has detected an occupancy condition.

Alternatively, the electronic switch 110 could operate as a vacancy sensor. When operating as a vacancy sensor, the electronic switch 110 would only operate to turn off the lighting load 104 in response to detecting a vacancy condition in the space. The electronic switch 110 would not turn on the lighting load 104 in response to detecting an occupancy condition. Therefore, when the electronic switch operates as a vacancy sensor, the lighting load 104 must be turned on manually (e.g., in response to a manual actuation of the control actuator 116). Examples of occupancy and vacancy sensors are described in greater detail in U.S. patent application Ser. No. 12/203,500, filed Sep. 3, 2008, entitled BATTERY-POWERED OCCUPANCY SENSOR, the entire disclosure of which is hereby incorporated by reference.

Figure 2:
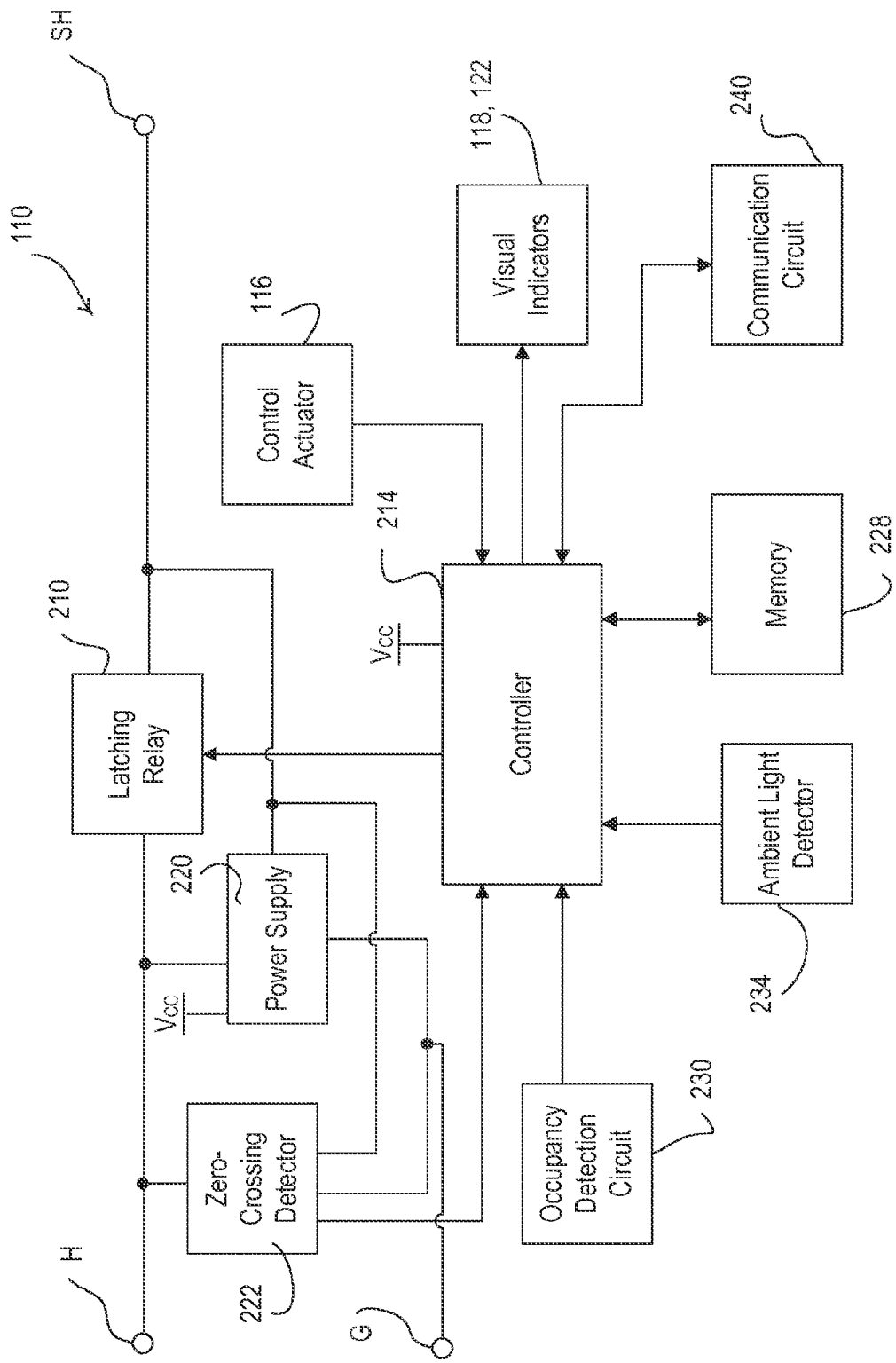
FIG. 2 is a simplified block diagram of the electronic switch of FIG. 1.

FIG. 2 is a simplified block diagram of the electronic switch 110. The electronic switch 110 comprises a controllably conductive device (e.g., a latching relay 210) connected in series electrical connection between the hot terminal H and the switched hot terminal SH. The relay 210 conducts a load current from the AC power source 102 to the lighting load 104 when the relay is closed (i.e., conductive) and does not conduct a load current when the relay is opened (i.e., non-conductive). Alternatively, the controllably conductive device could comprise a triac, a field effect transistor (FET) within a bridge, two FETs coupled in anti-series connection, etc.

The relay 210 is independently controlled by a controller 214. For example, the controller 214 may be a microcontroller, but may alternatively be any suitable processing device, such as a programmable logic device (PLD), a microprocessor, an application specific integrated circuit (ASIC), or a field-programmable gate array (FPGA). The controller 214 is coupled to SET and RESET terminals (e.g., SET and RESET coils) of the relay 210 for causing the relay to become conductive and non-conductive, respectively. A zero-crossing detector 222 is coupled in series electrical connection between the hot terminal H and the ground terminal G as well as the switched hot terminal SH and the ground terminal G, and the zero-crossing detector determines the zero-crossings of the input AC waveform from the AC power supply 102. A zero-crossing is defined as the time at which the AC supply voltage transitions from positive to negative polarity, or from negative to positive polarity, at the beginning of each half-cycle. The zero-crossing information is provided as an input to the controller 214. The controller 214 controls the latching relay 210 such that the latching relay is rendered conductive near the zero-crossings of the input AC waveform to minimize electrical stress on the contacts of the relay and is used to detect loss of power.

The electronic switch 110 comprises a power supply 220 to generate a DC supply voltage $V_{CC}$ (e.g., having an average magnitude of approximately three volts). The controller 214 and other low-voltage circuitry of the electronic switch 110 are powered from the DC supply voltage $V_{CC}$. The power supply 220 is operable to generate the DC supply voltage $V_{CC}$ in response to the leakage current flowing from the hot terminal H to the ground terminal G and from the switched hot terminal SH to the ground terminal G.

The controller 214 is coupled to the control actuator 116 such that the controller receives inputs in response to actuations of the control actuator 116 of the electronic switch 110. Accordingly, the controller 214 is operable to control the relay 210 to toggle the lighting load 104 on and off in response to actuations of the control actuator 116. The controller 214 is further operable to control the visual indicator 118 to be illuminated when the lighting load 104 is on and not illuminated when the lighting load is off. According to an alternate embodiment, the visual indicator 118 may not be present on the electronic switch. The controller 214 is also coupled to a memory 228 for storage of operational characteristics of the electronic switch 110. The memory 228 may be implemented as an external integrated circuit (IC) or as an internal circuit of the controller 214.

The electronic switch 110 may further comprise a communication circuit 240. The communication circuit 240 may be coupled to a wired communication link (not shown) such the controller 214 can receive and/or transmit signals or digital messages from other devices in the lighting control system 100. The controller 214 may be operable to control the relay 210 in response to the signals or digital messages received via the wired communication link. Alternatively, the communication circuit 240 may comprise a radio-frequency (RF) transceiver (not shown) and an antenna (not shown) for transmitting and receiving digital messages via RF signals. Examples of RF load control devices and antennas for wall-mounted load control devices are described in greater detail in commonly-assigned U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

As previously mentioned, the electronic switch 110 comprises the occupancy detection circuit 230 that includes an internal detector, e.g., a pyroelectric infrared (PIR) detector. The internal detector is mounted in the electronic switch 110 so as to receive the infrared energy of the occupant in the space through the lens 120. The controller 214 is coupled to the occupancy detection circuit 230, such that the controller is operable to process the output of the internal detector to determine whether an occupancy condition or a vacancy condition is presently occurring in the space, for example, by comparing the output of the PIR detector to a predetermined occupancy voltage threshold. Alternatively, the internal detector could comprise an ultrasonic detector, a microwave detector, or any combination of PIR detectors, ultrasonic detectors, and microwave detectors. The controller 214 operates in an "occupied" state or a "vacant" state in response to the detections of occupancy or vacancy conditions, respectively, in the space. The controller 214 is operable to control the relay 210 in response to the occupancy detection circuit 230.

The electronic switch 110 also comprises an ambient light detector 234 (e.g., a photocell) for detecting the level of ambient light around the electronic switch. The controller 214 is coupled to the ambient light detector 234 and regularly measures and filters the ambient light level. When an occupancy condition is first detected, a measured ambient light level $L_M$ is compared to a predetermined ambient light level threshold $L_T$. If the measured ambient light level $L_M$ is less than the predetermined ambient light level threshold $L_T$ when an occupancy condition is detected by the electronic switch 110, the controller 214 controls the latching relay 210 to be conductive. On the other hand, if the measured ambient light level $L_M$ is greater than the ambient light level threshold $L_T$ when an occupancy condition is first detected, the controller does not control the latching relay 210 to be conductive. Accordingly, the electronic switch 110 does not turn on the lighting load 104 if the ambient light level in the space is sufficiently high.

Figure 3:
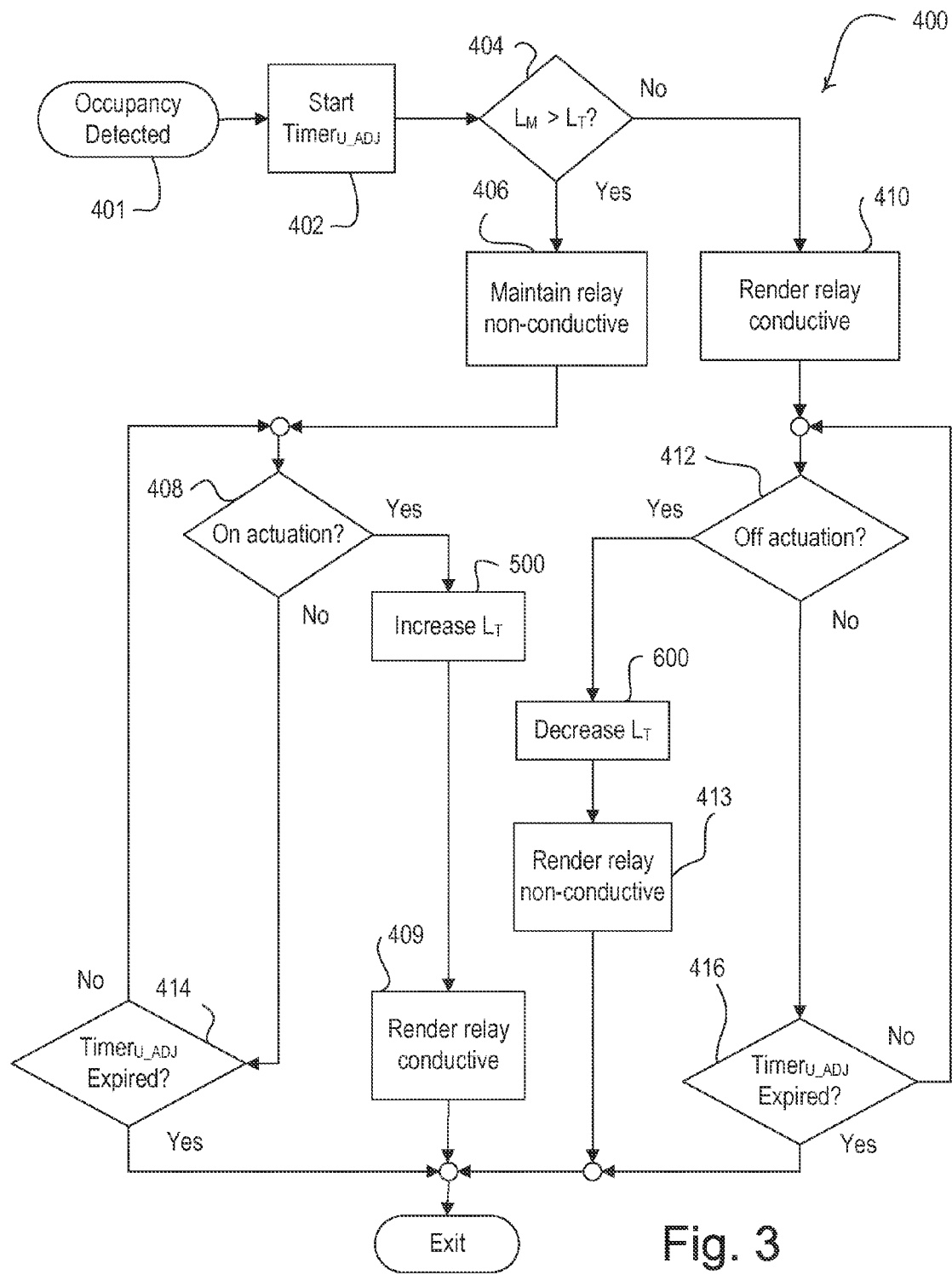
FIG. 3 is a simplified flowchart of an occupancy detection procedure.

FIG. 3 is simplified flowchart of an occupancy detection procedure 400 performed by the controller 214 of the electronic switch 110. The occupancy detection procedure 400 is performed in response to the controller 214 first detecting an occupancy condition (e.g., when the controller transitions from operating in a vacant state to an occupied state). During the occupancy detection procedure 400, the controller 214 of the electronic switch 110 makes a decision as to whether to automatically turn on the lighting load 104 based on the ambient light level threshold $L_T$. Then, the controller 214 subsequently monitors user interactions (e.g, actuations of the control actuator 116) to determine whether the user desires to change the state of the lighting load 104. In the event that the user does desire to change the state of the lighting load 104, the electronic switch 110 is operable to respond and change the state of the lighting load accordingly (i.e., allow the user to manually override the automatic control). Further, based on the user interactions, the electronic switch 110 can infer whether the ambient light level threshold $L_T$ requires adjustment to better suit the needs of the user. In other words, the controller 214 can learn the appropriate value of the ambient light level threshold $L_T$ that best meets user preferences. If the controller 214 determines that the ambient light level threshold $L_T$ does require adjustment, then the controller subsequently executes ambient light level threshold adjustment procedures 500 and 600 as will be described further below. Additionally, the electronic switch 110 may be operable to disregard certain user interactions such that spurious events do not impact the ambient light level threshold $L_T$.

The occupancy detection procedure 400 begins after occupancy has first been detected at step 401, and the controller 214 sets and begins decrementing a user-adjust timer (Timer$_{U\_ADJ}$) at step 402. The user-adjust timer Timer$_{U\_ADJ}$ establishes a time window (e.g., approximately 5 seconds) during which the controller 214 monitors user interactions after occupancy detection. At step 404, the controller 214 compares the measured ambient light level $L_M$ to the predetermined ambient light level threshold $L_T$. The predetermined ambient light level threshold $L_T$ may initially comprise a default value (e.g., 2.5 foot-candles) that is stored in the memory 228 of the electronic switch 110 at the time of manufacture. Subsequently, the ambient light level threshold $L_T$ may comprise a value that has already been modified during subsequent executions of ambient light level threshold increase adjustment procedure 500 and/or ambient light level threshold decrease adjustment procedure 600.

If the measured ambient light level $L_M$ is greater than the ambient light level threshold $L_T$, the controller 214 maintains the relay 210 non-conductive (i.e., does not render the latching relay to be conductive) at step 406 such that the lighting load 104 remains off. Then, at step 408, the controller 214 checks to see whether the control actuator 116 has been actuated to turn on the lighting load 104. If the control actuator has not been actuated to turn on the lighting load 104, the controller then checks whether the user-adjust timer has expired at step 414. If the user-adjust timer has not expired, the controller 214 continues to look for actuations until the user-adjust timer expires at step 414 at which time the controller 214 exits the occupancy detection procedure 400.

If the user does actuate the control actuator 116 to turn on the lighting load 104 at step 408, then the controller 214 executes the ambient light level threshold increase adjustment procedure 500 to increase the value of the predetermined ambient light level threshold $L_T$ before rendering the relay conductive at step 409 (to respond to the actuation of the control actuator 116) and exiting the occupancy detection procedure 400. In other words, the controller 214 initially determines that there is sufficient ambient light in the space at step 404 based on the predetermined ambient light level threshold $L_T$, and then accordingly, does not turn on the lighting load 104 at step 406. However, because the user manually turned on the lighting load 104 at step 408 (i.e., indicating that there was, in fact, not sufficient ambient light in the space), the controller 214 may increase the value of the ambient light level threshold $L_T$ during the ambient light level threshold increase adjustment procedure 500. Thus, the next time that the occupancy detection procedure 400 is executed, the controller 214 may rely upon a slightly increased value of the ambient light level threshold $L_T$ such that at step 404, the controller may be more likely to turn on the lighting load 104 during conditions when the measured ambient light level $L_M$ is approximately equal to the currently measured ambient light level.

If the measured ambient light level $L_M$ is not greater than the ambient light level threshold $L_T$ at step 404, the controller 214 renders the latching relay 210 to be conductive at step 410 (i.e., the lighting load 104 turns on). Then, the controller 214 checks whether the control actuator 116 has been actuated to turn off the lighting load 104. If the control actuator 116 has been actuated to turn off the lighting load 104, then the controller 214 executes the ambient light level threshold decrease adjustment procedure 600 to decrease the predetermined ambient light level threshold $L_T$ before rendering the relay non-conductive at step 413 (to respond to the actuation of the control actuator 116) and subsequently exiting the occupancy detection procedure 400. In other words, the controller 214 initially determines that there is not sufficient ambient light in the space at step 404 based on the initial value of the ambient light level threshold $L_T$, and then accordingly, turns on the lighting load 104 at step 410. However, because the user manually turned off the lighting load 104 at step 412 (i.e., indicating that there was, in fact, sufficient ambient light in the space before the controller 214 rendered the relay 210 conductive), the controller 214 decreases the value of the ambient light level threshold $L_T$ during ambient light level threshold decrease adjustment procedure 600. Thus, the next time that the occupancy detection procedure 400 is executed, the controller 214 will use an ambient light level threshold $L_T$ having a slightly decreased value such that at step 404, the controller will be less likely to turn on the lighting load 104 during conditions when the measured ambient light level $L_M$ is approximately equal to the currently measured ambient light level.

If the controller 214 does not receive any actuations of the control actuator 116 at step 412, the controller then checks whether the user-adjust timer has expired at step 416. If the user-adjust timer has not expired, the controller 214 continues to look for actuations until the user-adjust timer expires upon which the controller 214 exits the occupancy detection procedure 400.

Figure 4A:
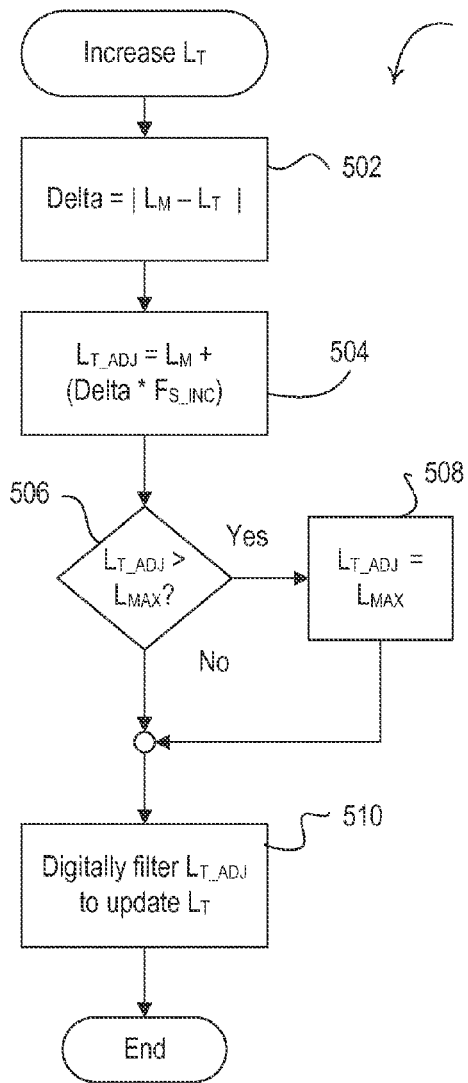
FIG. 4A is a simplified flowchart of an ambient light level threshold increase adjustment procedure.

FIG. 4A is a simplified flowchart of the ambient light level threshold increase adjustment procedure 500. At step 502, the controller 214 calculates an ambient light level threshold delta by subtracting the ambient light level threshold $L_T$ from the measured ambient light level $L_M$ as shown in the following equation:

$$\text{Delta} = |L_M - L_T|. \quad \text{(Equation 1)}$$

At step 504, an adjusted ambient light level threshold $L_{T\_ADJ}$ is calculated using the following equation:

$$L_{T\_ADJ} = L_M + (\text{Delta} * F_{S\_INC}) \quad \text{(Equation 2)}$$

where $F_{S\_INC}$ is a scaling increase factor (e.g., approximately ¼ or ½). Then, at step 506, the adjusted ambient light level threshold $L_{T\_ADJ}$ is compared to a maximum ambient light level $L_{MAX}$ (e.g., approximately 40 foot-candles). If the adjusted ambient light level threshold $L_{T\_ADJ}$ exceeds the maximum ambient light level $L_{MAX}$, then at step 508, the value of the adjusted ambient light level threshold $L_{T\_ADJ}$ is set to the maximum ambient light level.

Then, at step 510 the adjusted ambient light level threshold $L_{T\_ADJ}$ is digitally filtered to determine a new value of the ambient light level threshold $L_T$, for example, using a digital filter characterized by the following equation:

$$L_T = [L_{T\_ADJ} + L_{T\_1} + (L_{T\_2} * 2)]/4 \quad \text{(Equation 3)}$$

where $L_{T\_1}$ and $L_{T\_2}$ are historical values of the ambient light level threshold. For example, $L_{T\_1}$ is the previous value of the ambient light level threshold $L_T$ and $L_{T\_2}$ is the value of the ambient light level threshold used before the previous value $L_{T\_1}$. Thus, the controller 214 digitally filters the adjusted ambient light level threshold $L_{T\_ADJ}$ using historical ambient light thresholds to avoid grossly adjusting the ambient light level threshold $L_T$. Finally, the controller exits the ambient light level threshold increase procedure 500.

Figure 4B:
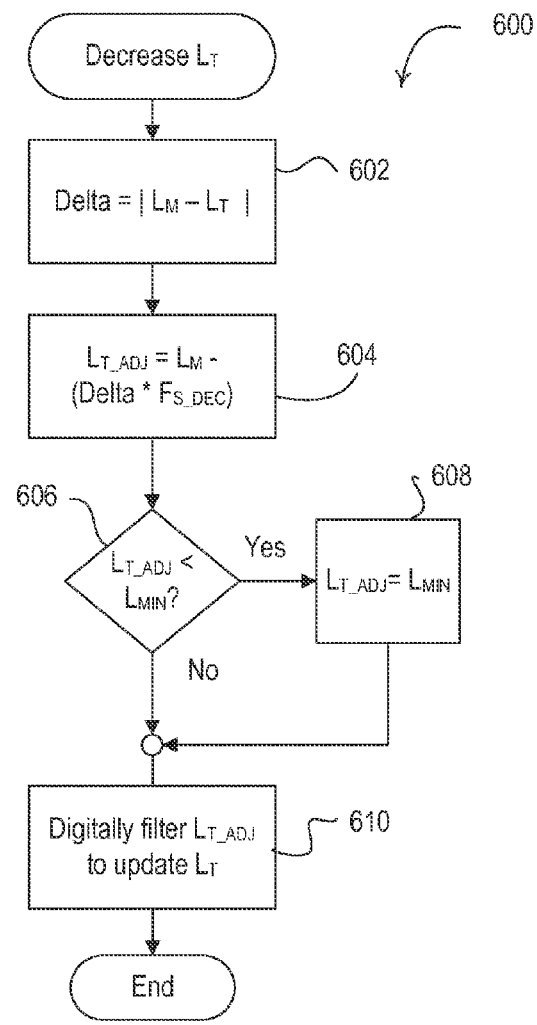
FIG. 4B is a simplified flowchart of an ambient light level threshold decrease adjustment procedure.

FIG. 4B is a simplified flowchart of the ambient light level threshold decrease adjustment procedure 600. At step 602, the controller 214 calculates the ambient light level threshold delta using Equation 1 as described above. Then at step 604, the adjusted value of the ambient light level threshold $L_{T\_ADJ}$ is calculated using the following equation:

$$L_{T\_ADJ} = L_M - (\text{Delta} * F_{S\_DEC}) \quad \text{(Equation 4)}$$

where $F_{S\_DEC}$ is a scaling decrease factor (e.g., approximately ¼ or ½). Then at step 606, the adjusted value of the ambient light level threshold $L_{T\_ADJ}$ is compared to a minimum ambient light level $L_{MIN}$ (e.g., approximately 1 foot-candle). If the adjusted value of the ambient light level threshold $L_{T\_ADJ}$ is less than the minimum ambient light level $L_{MIN}$, then at step 608, the adjusted ambient light level threshold is set to the minimum ambient light level. Next at step 610, the adjusted ambient light level threshold $L_{T\_ADJ}$ is digitally filtered to determine a new value of the ambient light level threshold $L_T$ using Equation 3 described above before the controller exits the ambient light level threshold decrease procedure 600.

Additionally, when the user does not adjust or override the automatic response of the electronic switch 110 during the occupancy detection procedure 400, the controller 214 may be operable to capture that event and apply it to a digital filter. In other words, if the automatic response of the electronic switch based on the present ambient light level threshold $L_T$, did not result in any subsequent user actuations, then it may be valuable to factor that event into the formulation of the ambient light level threshold. More particularly, if the user-adjust timer expires at steps 414 or 416 (i.e., actuator is not accessed by a user during the time window) during the occupancy detection procedure 400, the controller 214 is further operable to update a new value of the ambient light level threshold $L_T$, for example, using a digital filter characterized by the following equation:

$$L_T = [L_T + L_{T\_1} + (L_{T\_2} * 2)]/4 \quad \text{(Equation 5)}$$

to appropriately factor the current ambient light level threshold $L_T$ into the digital filter. Equation 5 is essentially the same as equation 4, however, equation 5 relies upon the current ambient light level threshold $L_T$ rather than the adjusted ambient light level threshold $L_{T\_ADJ}$.

In short, the controller 214 of the electronic switch 110 digitally filters historical data of user actuations to appropriately adjust the ambient light level threshold $L_T$ based on usage representative of typical everyday use of the electronic switch. Alternatively, the controller 214 may process the historical data of user actuations in a different fashion than described above, for example, by using a box car average technique or a box car median technique to update the appropriate ambient light level threshold.

While the present invention has been described with reference to the electronic switch 110 controlling the power delivered to a connected lighting load, the concepts of the present invention could be used in any type of control device of a load control system, such as, for example, a dimmer switch for adjusting the intensity of a lighting load (such as an incandescent lamp, a magnetic low-voltage lighting load, an electronic low-voltage lighting load, and a screw-in compact fluorescent lamp), a remote control, a keypad device, a visual display device, a controllable plug-in module adapted to be plugged into an electrical receptacle, a controllable screw-in module adapted to be screwed into the electrical socket (e.g., an Edison socket) of a lamp, an electronic dimming ballast for a fluorescent load, a driver for a light-emitting diode (LED) light source, a motor speed control device, a motorized window treatment, a temperature control device, an audio/visual control device, or a dimmer circuit for other types of lighting loads, such as, magnetic low-voltage lighting loads, electronic low-voltage lighting loads, and screw-in compact fluorescent lamps.

Additionally, the concepts of the present invention could be used in load control systems where the ambient light detector and/or occupancy detector and/or control actuator, etc are located remotely from the controller and are operable to communicate over a wired or wireless communication link. Examples of such load control systems are described in greater detail in commonly-assigned U.S. patent application Ser. No. 12/845,016, filed Jul. 28, 2010, entitled LOAD CONTROL SYSTEM HAVING AN ENERGY SAVINGS MODE, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for controlling power delivered from an AC power source to an electrical load, the method comprising:
    detecting an occupancy condition;
    comparing a measured ambient light level to a first value of an ambient light level threshold;
    controlling the power delivered to the electrical load in response to detecting the occupancy condition and comparing the measured ambient light level;
    receiving an actuation to change a state of the electrical load after controlling the power; and
    adjusting the ambient light level threshold to a second value in response to receiving the actuation.

2. The method of claim 1, further comprising:
    determining that the measured ambient light level exceeds the first value of the ambient light level threshold.

3. The method of claim 2, wherein controlling the power further comprises:
    maintaining the electrical load in an off state.

4. The method of claim 3, further comprising:
    turning the electrical load on in response to receiving the actuation.

5. The method of claim 4, wherein adjusting the ambient light level threshold further comprises:
    increasing the ambient light level threshold from the first value to the second value.

6. The method of claim 1, further comprising:
    determining that the measured ambient light level does not exceed the first value of the ambient light level threshold.

7. The method of claim 6, wherein controlling the power further comprises:
    automatically turning the electrical load on.

8. The method of claim 7, further comprising:
    turning the electrical load off in response to receiving the actuation.

9. The method of claim 8 wherein adjusting the ambient light level threshold further comprises:
    decreasing the ambient light level threshold from the first value to the second value.

10. The method of claim 1 further comprising:
    detecting a second occupancy condition; and
    comparing the measured ambient light level to the second value of the ambient light level threshold.

11. The method of claim 1, wherein adjusting the ambient light level threshold further comprises:
    calculating a difference between the measured ambient light level and the first value of the ambient light level threshold; and
    using the calculated difference to adjust the ambient light level threshold from the first value to the second value.

12. The method of claim 11, further comprising:
    multiplying the calculated difference by a scaling factor; and
    adjusting a value of the measured ambient light level by the product of the calculated difference and the scaling factor to generate an adjusted value of the ambient light level threshold;
    wherein the adjusted value of the ambient light level threshold is used to adjust the ambient light level threshold from the first value to the second value.

13. The method of claim 12, wherein the adjusted value of the ambient light level threshold is the second value of the ambient light level threshold.

14. The method of claim 12, further comprising:
    digitally filtering the adjusted value of the ambient light level threshold to generate the second value of the ambient light level threshold.

15. A load control device adapted to be coupled between an AC power source and an electrical load for controlling power delivered to the load, the load control device comprising:
    a controllably conductive device adapted to be coupled between the source and the load for controlling the power delivered to the load;
    a controller operatively coupled to the controllably conductive device for rendering the controllably conductive device conductive and non-conductive;
    an actuator operatively coupled to the controller such that the controller is operable to render the controllably conductive device conductive and non-conductive in response to actuations of the actuator;

an occupancy detection circuit for detecting the presence or absence of an occupant, the occupancy detection circuit operatively coupled to the controller; and an ambient light detector for measuring an ambient light level, the ambient light detector operatively coupled to the controller, the controller operable to compare a measured ambient light level to an ambient light level threshold, the controller further operable to render the controllably conductive device conductive and non-conductive in response to the occupancy detection circuit and the comparison of the measured ambient light level to the ambient light level threshold;

wherein the controller is further operable to automatically adjust the ambient light level threshold in response to detecting an actuation of the actuator that occurs after detecting the presence of an occupant.

16. The load control device of claim 15, wherein the controller is operable to render the controllably conductive device conductive in response to detecting the presence of an occupant and determining that a measured ambient light level does not exceed a first value of the ambient light level threshold.

17. The load control device of claim 16, wherein in response to receiving an actuation to render the controllably conductive device non-conductive, the controller is operable to decrease the ambient light level threshold to a second value less than the first value.

18. The load control device of claim 15, wherein the controller is operable to maintain the controllably conductive device non-conductive in response to detecting the presence of an occupant and determining that the measured ambient light level does exceed a first value of the ambient light level threshold.

19. The load control device of claim 18, wherein in response to receiving an actuation to render the controllably conductive device conductive, the controller is operable to increase the ambient light level threshold to a second value greater than the first value.

20. A load control system for controlling power delivered to a load, the load control system comprising:

at least one actuator operable to receive actuations to turn the load on or off in response to the actuations;

an occupancy detector for detecting the presence or absence of an occupant;

an ambient light detector for measuring an ambient light level;

a controller operable to respond to actuations of the actuator, the controller configured to compare a measured ambient light level to an ambient light level threshold; and a load control device adapted to be coupled between an AC power source and the load for controlling the power delivered to the load in response to the controller;

wherein the controller is operable to control the load control device in response to the occupancy detector and the comparison of the measured ambient light level to the ambient light level threshold, the controller further operable to automatically adjust the ambient light level threshold in response to detecting an actuation of the actuator that occurs after detecting the presence of an occupant.

21. The load control system of claim 20, wherein the controller is operable to control the load control device to deliver power to the load in response to detecting the presence of an occupant and determining that a measured ambient light level does not exceed a first value of the ambient light level threshold.

22. The load control system of claim 21, wherein in response to receiving an actuation to turn off the load, the controller is operable to decrease the ambient light level threshold to a second value less than the first value.

23. The load control system of claim 20, wherein the controller is operable to control the load control device to maintain the load off in response to detecting the presence of an occupant and determining that the measured ambient light level does exceed a first value of the ambient light level threshold.

24. The load control system of claim 23, wherein in response to receiving an actuation to turn on the load, the controller is operable to increase the ambient light level threshold to a second value greater than the first value.

* * * * *